United States Patent
Bargury et al.

(10) Patent No.: US 12,254,095 B2
(45) Date of Patent: Mar. 18, 2025

(54) DATA-FLOW ANALYSIS FOR COMPUTING SYSTEMS DEPLOYING MULTIPLE SOFTWARE APPLICATIONS

(71) Applicant: Zenity Ltd., Tel-Aviv (IL)

(72) Inventors: Michael Zeev Bargury, Ramat Gan (IL); Ben Kliger, Ramat Gan (IL)

(73) Assignee: Zenity Ltd., Tel-Aviv (IL)

( * ) Notice: Subject to any disclaimer, the term of this patent is extended or adjusted under 35 U.S.C. 154(b) by 257 days.

(21) Appl. No.: 17/739,218

(22) Filed: May 9, 2022

(65) Prior Publication Data

US 2023/0169181 A1 Jun. 1, 2023

Related U.S. Application Data

(63) Continuation of application No. PCT/IB2022/053600, filed on Apr. 18, 2022.

(60) Provisional application No. 63/283,549, filed on Nov. 29, 2021.

(51) Int. Cl.
  *G06F 21/00* (2013.01)
  *G06F 9/54* (2006.01)
  *G06F 21/55* (2013.01)
  *G06F 21/57* (2013.01)

(52) U.S. Cl.
  CPC ............. *G06F 21/577* (2013.01); *G06F 9/54* (2013.01); *G06F 21/556* (2013.01); *G06F 2221/034* (2013.01)

(58) Field of Classification Search
  CPC ........ G06F 21/577; G06F 9/54; G06F 21/556; G06F 2221/034
  See application file for complete search history.

(56) References Cited

U.S. PATENT DOCUMENTS

| | | |
|---|---|---|
| 2012/0210428 A1* | 8/2012 | Blackwell ............... G06F 16/23 726/23 |
| 2013/0024942 A1 | 1/2013 | Wiegenstein et al. |
| 2013/0276108 A1 | 10/2013 | Blackwell |
| 2014/0068696 A1 | 3/2014 | Schaad |
| 2017/0366416 A1* | 12/2017 | Beecham ................ H04L 45/50 |
| 2018/0189389 A1 | 7/2018 | Baldini et al. |

OTHER PUBLICATIONS

International Application # PCT/IB2022/053600 Search Report dated Aug. 9, 2022.

* cited by examiner

*Primary Examiner* — Tri M Tran
(74) *Attorney, Agent, or Firm* — Meitar Patents Ltd.; Daniel Kligler (57) ABSTRACT

A method for data-flow analysis includes constructing a data-flow graph for a computing system that runs multiple software applications. The data-flow graph includes (i) vertices representing data locations in the computing system, and (ii) edges representing data movements performed by the software applications between the data locations. One or more multi-hop paths are identified in the data-flow graph, each multi-hop path including a sequence of two or more edges that represents multi-hop movement of data in the computing system. One or more of the identified multi-hop paths are acted upon.

18 Claims, 4 Drawing Sheets

DATA-FLOW ANALYSIS FOR COMPUTING SYSTEMS DEPLOYING MULTIPLE SOFTWARE APPLICATIONS

CROSS-REFERENCE TO RELATED APPLICATIONS

This application is a continuation of PCT Application PCT/IB2022/053600, filed Apr. 18, 2022. This application claims the benefit of U.S. Provisional Patent Application 63/283,549, filed Nov. 29, 2021. The disclosures of these related applications are incorporated herein by reference.

FIELD OF THE INVENTION

The present invention relates generally to computing systems, and particularly to methods and systems for data-flow analysis in computing systems that deploy multiple software applications.

BACKGROUND OF THE INVENTION

Computing systems often deploy a large number of software applications of various types and from various sources. For example, an enterprise system may use a mixture of applications that run on on-premises platforms and cloud-based applications. Some applications may run as Software-as-a-Service (SaaS). Some applications may be provided by third parties, while other applications may be developed within the organization. Some internally developed applications may be automations developed using various No-Code/Low-Code (NCLC) tools. Data governance, e.g., data security, is extremely challenging in such environments.

SUMMARY OF THE INVENTION

An embodiment of the present invention that is described herein provides a method for data-flow analysis. The method includes constructing a data-flow graph for a computing system that runs multiple software applications. The data-flow graph includes (i) vertices representing data locations in the computing system, and (ii) edges representing data movements performed by the software applications between the data locations. One or more multi-hop paths are identified in the data-flow graph, each multi-hop path including a sequence of two or more edges that represents multi-hop movement of data in the computing system. One or more of the identified multi-hop paths are acted upon.

In some embodiments, constructing the data-flow graph includes defining, in a vertex that represents a data location, multiple levels of hierarchy that specify the data location with increasing levels of granularity. In some embodiments, identifying the multi-hop paths includes detecting a multi-hop path that is indicative of a policy violation. In an example embodiment, the policy violation includes a security breach. In another embodiment, identifying the multi-hop paths includes detecting an implicit data dependency between at least two different software applications.

In a disclosed embodiment, acting upon the identified multi-hop paths includes specifying a segmentation rule with respect to the data-flow graph, and initiating an action in response to detecting a violation of the segmentation rule. In another embodiment, acting upon an identified multi-hop path includes disabling one or more of the applications that move data on the multi-hop path. In yet another embodiment, acting upon an identified multi-hop path includes issuing an alert.

In an embodiment, constructing the data-flow graph includes collecting from the computing system information pertaining to the software applications and to the data movement operations, normalizing the information to a common schema, and constructing the data-flow graph from the normalized information. In an embodiment, the method further includes presenting at least part of the data-flow graph visually to a user. In another embodiment, the method further includes receiving a query from a user, and serving the query by querying the data-flow graph.

There is additionally provided, in accordance with an embodiment of the present invention, an apparatus for data-flow analysis. The apparatus includes one or more interfaces for connecting to a computing system that runs multiple software applications, and one or more processors. The one or more processors are configured to construct a data-flow graph for the computing system, the data-flow graph including (i) vertices representing data locations in the computing system, and (ii) edges representing data movements performed by the software applications between the data locations, to identify one or more multi-hop paths in the data-flow graph, each multi-hop path including a sequence of two or more edges that represents multi-hop movement of data in the computing system, and to act upon one or more of the identified multi-hop paths.

The present invention will be more fully understood from the following detailed description of the embodiments thereof, taken together with the drawings in which:

DETAILED DESCRIPTION OF EMBODIMENTS

Overview

When a computing system deploys multiple software applications that process data, implicit dependencies between applications may cause data to be moved in unexpected and undesirable ways. Such unforeseen data movements may cause security breaches and other policy violations.

Consider, for example, the following scenario. The accounting department in an enterprise automates the process of expense report documentation. Every time an employee files an expense report, a software application is triggered. The application adds the report to a designated directory in a file server and updates an aggregated report. Meanwhile, without any knowledge of the above-described automation, the IT department of the enterprise deploys a software application that backs-up the same file server to the cloud. Both software applications are implicitly dependent on one another: They jointly move every filed expense report to the cloud. If the expense reports contain sensitive information, e.g., bank account numbers, this information may be exposed unintentionally. Note that in this example, not the accounting department nor the IT department is aware that the files in question are being moved to the cloud. Consequently, the breach cannot be discovered by any security or data governance team.

The above scenario is just one example that demonstrates the adverse effects of implicit, unintentional dependencies between software applications. In practical cases, the computing system of a large enterprise may well deploy hundreds or even thousands of different software applications. Control over the data flow in such a system is all but impossible when using conventional Data Leakage Prevention (DLP) tools and practices. The challenge becomes even more extreme when the enterprise allows the use of No-Code/Low-Code (NCLC) automations, which increases the number of applications considerably.

Embodiments of the present invention that are described herein provide methods and systems for analyzing the flow of data in computing systems. The disclosed techniques enable, inter alia, identifying implicit dependencies between applications, and acting upon the violations they cause.

In some embodiments, a data-flow analysis system maps the data-flow across a computing system by automatically constructing a Data-Flow Graph (DFG). The DFG comprises vertices connected by edges. The vertices represent data locations in the computing system. The edges represent data movements performed by software applications between data locations.

Each vertex in the DFG is a hierarchical construct that represents a "data location" in the computing system in increasing levels of granularity. The top vertex hierarchy represents types of data platforms, e.g., cloud, on-premises or SaaS. The next-lower hierarchy level represents specific vendors or technologies of data platforms, e.g., AWS, Salesforce, Snowflake and the like.

The next-lower hierarchy level represents specific instances in which data resides, e.g., AWS account, Salesforce instance or Snowflake endpoint. The next hierarchy level represents data objects within an instance of a data platform, e.g., AWS account billing, Salesforce lead or Snowflake table. The lowest vertex hierarchy level represents specific records, e.g., "AWS account billing report of Q1 2020", "Salesforce Lead named NameOfCompany" or "Snowflake table record having index 20". Depending on the actual data platforms being used, different vertices in the DFG may have different hierarchy depths. Within a given vertex, every pair of adjacent (parent-child) levels of hierarchy is connected by a bidirectional edge. As seen, although denoted "data locations", the vertices represent not only locations but also identities associated with the data.

In addition, the DFG comprises directed edges that connect pairs of vertices. Each directed edge represents a data movement operation performed by a software application. Software applications may be of various types, e.g., Saas, LCNC, script, on-prem and the like. When a given application performs multiple different data movements, the application will be mapped to multiple edges. Each directed edge connects the vertex representing the data source to the vertex representing the data sink of the data movement operation. In each of the data-source and data-sink vertices, the edge is connected to the lowest (finest-granularity) hierarchy level of the vertex.

Once the DFG is in place, an implicit dependency between applications appears in the DFG as a multi-hop path, i.e., a sequence of two or more edges pertaining to certain data. In some embodiments, the analysis system identifies multi-hop paths automatically, assesses whether any of the multi-hop paths warrants a responsive action, and initiates responsive actions as appropriate.

Additionally or alternatively, the analysis system may visualize the DFG to users, and enable users to explore the DFG, submit queries relating to data flow, and perform "what-if" analysis. The analysis system may also use the DFG to define, recommend and enforce rules and policies relating to data flow.

In this manner, the DFG representation, and in particular the identification of multi-hop paths, enables deep visibility and control over data flow in complex computing systems.

System Description

Figure 1:
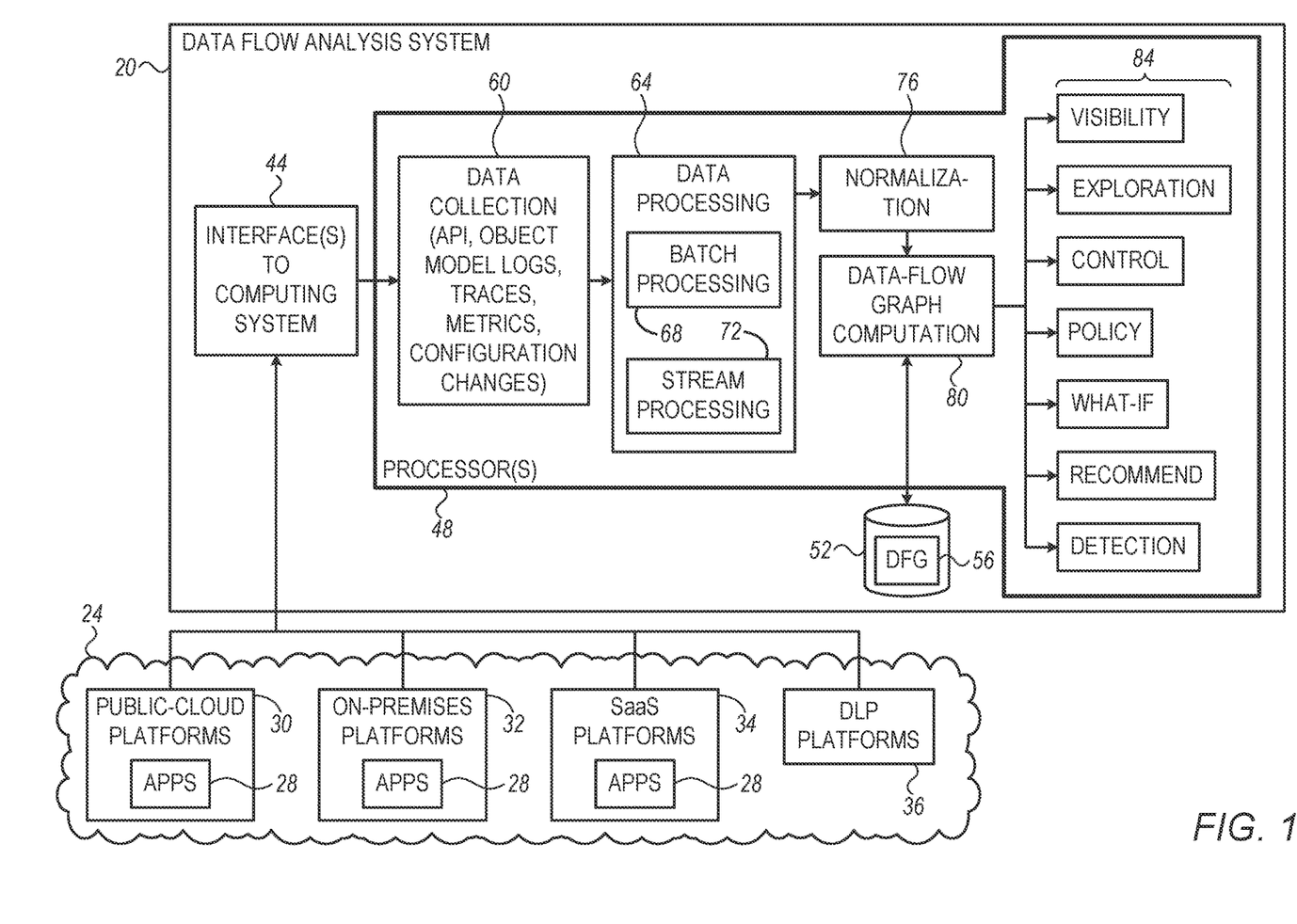
FIG. 1 is a block diagram that schematically illustrates a data-flow analysis system, in accordance with an embodiment of the present invention.

FIG. 1 is a block diagram that schematically illustrates a data-flow analysis system 20, in accordance with an embodiment of the present invention. Analysis system 20 analyzes the data flow across a computing system 24. Computing system 24 may comprise, for example, an enterprise network, a data center or any other suitable type of computing system.

Computing system 24 runs a plurality of software applications ("apps") 28. Applications 28 may run on any suitable types of computers, such as one or more cloud-based computing platforms 30 (e.g., Virtual Machines—VMs), one or more on-premises computing platforms 32 (e.g., physical servers or other computing devices, including NCLC automation platforms) and/or one or more SaaS platforms 34. As yet another example, some apps 28 may run of a platform that is owned by a certain vendor, but has a configuration surface for the user organization or manages organization data. Examples of such a configuration include Open Authorization (OAuth) applications, SaaS plugins and marketplace apps. Yet another example type of apps 28 are Robotic Process Automation (RPA) apps. Computing system 24 further comprises one or more DLP platforms 36.

Analysis system 20 comprises one or more interfaces 44 for communicating with computing system 24, and one or more processors 48 that carry out the techniques described herein. For the sake of clarity, the description that follows will refer to a single processor 48. Analysis system 20 further comprises a memory 52 in which processor 48 stores a Data-Flow Graph (DFG) 56. DFG 56 represents the data flow in computing system 24, and is a fundamental building block of the disclosed techniques.

In the embodiment of FIG. 1, processor 48 runs the following software modules:

Data collection modules 60: One or more software modules that collect information from computing system 24 for constructing DFG 56. Modules 60 collect and aggregate data from multiple sources. Data can be collected in real-time (e.g., using a "push" model) and/or in batch (e.g., using a "pull" model). For each monitored platform, modules 60 comprise a connector to collect relevant data from that platform. Monitored platforms may comprise, for example, automation platforms (e.g., iPaaS, SaaS automation, RPA solutions and other platforms that are focused on moving data and integrating services), SaaS platforms (e.g., platforms 34, typically holding key business data and often offering native data integration capabilities), public cloud platforms (e.g., platforms 30, typically infrastructure owned by the customer and managed by a public cloud provider), DLP solutions (e.g., platforms 36), and/or any other suitable purchased or homegrown platforms.

Collected data typically comprises applications and data movement operations between applications.

Data processing module 64, comprising batch processing module 68 and stream processing module 72. Modules 64 and 68 perform, for example, normalization for data that has changed, and update the results in the DFG. Data that is collected in a pull model is typically routed to batch processing module 68, whereas data that is collected in a push model is typically routed to stream processing module 72. The separation between batch and stream processing allows moving most data through batch processing module 68 and exploit the cost & performance advantages of batch processing. Stream processing module 72 allows for quick processing time and reduces time-to-action for automatic mitigation or detection.

Normalization module 76. A software module that normalizes the collected data into a generic, system-wide consistent schema. Typically, module 76 represents the collected data (e.g., applications and data movements between applications) in terms of the vertices and edges of DFG 56. In an embodiment, platform connections are mapped to a global service mapping table, to ensure that the representation of services is common between platforms. For example, SalesForce representation in Azure should be mapped to the same entity as SalesForce representation in Workato.

DFG computation module 80: A software module that constructs DFG 56 and stores the DFG in memory 52.

Control modules 84: Software modules that query DFG 56 for performing various control and analysis tasks. Example modules comprise a visibility module, an exploration module, a control module, a policy module, a "what-if" analysis module, a recommendation module and a risky-flow detection module. The operation of these modules is explained further below.

The configurations of computing system 24 and data-flow analysis system 20, and their various components, as shown in FIG. 1, are example configurations that are depicted purely for the sake of conceptual clarity. In alternative embodiments, any other suitable configurations can be used. For example, analysis system 20 may be implemented on-premises, in a private or public cloud, or as a SaaS.

In various embodiments, systems 20 and 24 and their various components may be implemented using any suitable software or hardware architecture and any suitable "division of labor" among the various software and hardware components. In some embodiments, any of the processors in systems 20 and 24, e.g., any of processors 48, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Data-Flow Analysis Using Data-Flow Graph

Figure 2:
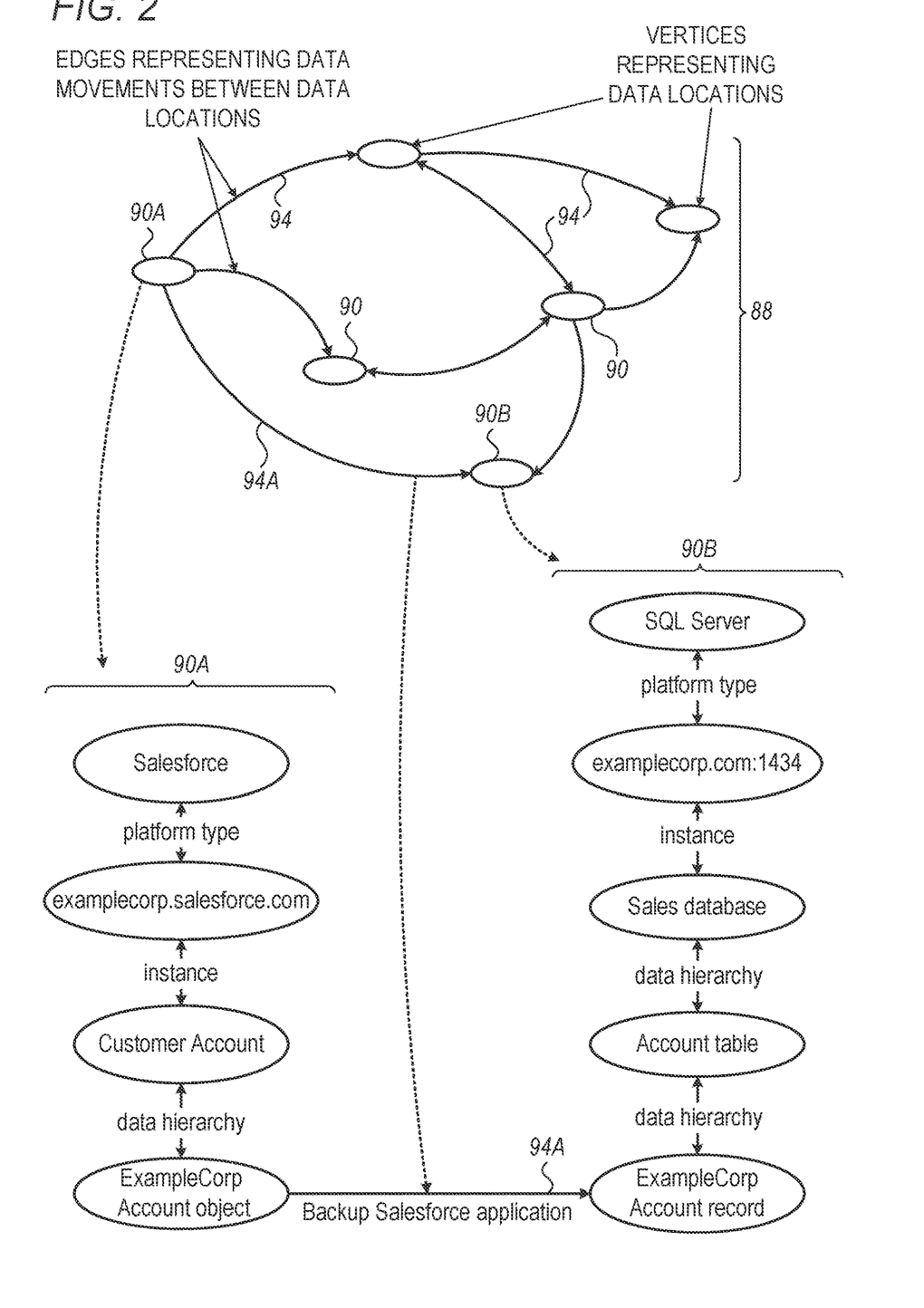
FIG. 2 is a diagram that schematically illustrates a Data-Flow Graph (DFG) used for data-flow analysis in the system of FIG. 1, in accordance with an embodiment of the present invention.

FIG. 2 is a diagram that schematically illustrates a Data-Flow Graph (DFG) 88 used for data-flow analysis, in accordance with an embodiment of the present invention. This sort of structure can be used, for example, for implementing DFG 56 in analysis system 20 of FIG. 1.

As seen at the top of the figure, DFG 88 comprises (i) multiple vertices 90 representing data locations in computing system 24, and (ii) multiple edges 94 representing data movement operations between data locations, which are performed by apps 28. Some edges 94 are unidirectional, in cases in which the data movement is in one direction. When data movement is bidirectional, the corresponding edge 94 is bidirectional.

In many practical cases, apps and the data flow between them changes over time. Therefore, in some embodiments, analysis system 20 continually collect information from the various platforms and updates the DFG accordingly. Previous versions of the DFG may be retained for analysis and comparison.

The bottom of the figure shows the internal structure of two of vertices 90, denoted 90A and 90B, demonstrating the hierarchy levels within each vertex 90. In this example, vertex 90A represents a specific account object within a specific customer account of a customer named "examplecorp" on a Salesforce platform. Vertex 90B represents an account record within an account table of a sales database of "examplecorp" on an SQL server.

In this example, a software application 28 in system 24 backs-up Salesforce data to the SQL server, and in particular backs-up the object represented by vertex 90A to the record represented by vertex 90B. This data movement is represented by an edge 94B.

For the sake of clarity, each of vertices 90A and 90B is depicted as a chain of hierarchy levels. In practice, a given vertex may comprise a tree structure, having the highest-level data platform (e.g., "salesforce") at the root and multiple lower-level objects at each lower-granularity hierarchy level. Also for the sake of clarity, the detailed hierarchical structure is depicted for only two of the vertices of DFG 88. The other vertices typically have similar hierarchical structures. In real-life systems DFG 88 is considerably larger and more complex, and may comprise many thousands of vertices 90 and edges 94.

Figure 3:
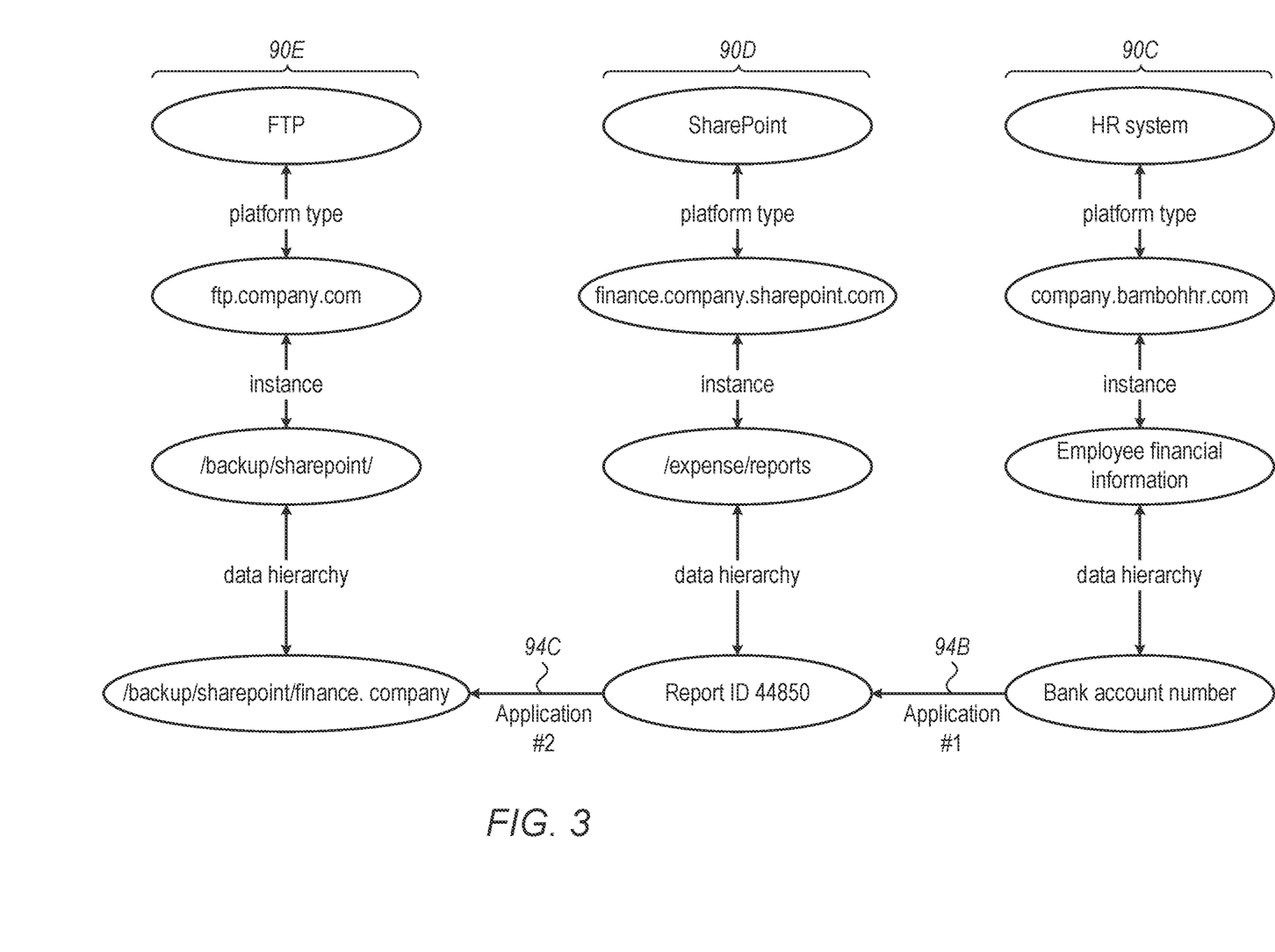
FIG. 3 is a diagram that schematically illustrates a multi-hop path in a DFG, in accordance with an embodiment of the present invention.

FIG. 3 is a diagram that schematically illustrates a multi-hop path in a DFG, in accordance with an embodiment of the present invention. As explained above, a multi-hop path may be indicative of an implicit dependency between two applications 28 that may have an undesirable effect, e.g., security breach or other policy violation.

In order to demonstrate the problem of implicit dependencies between applications, and the solution provided by detection of multi-hop paths, FIG. 3 shows a simple example involving two applications:

Application #1: An application created by the finance department, for streamlining the process of submitting expense reports by employees. Company employees can log into the application, submit their expense reports and track the submission progress. Once submitted, reports are enriched with financial information from the HR system, including the employee's bank account number, and are routed to the department's SharePoint site where they are picked up by the finance team for review.

Application #2: An application created by the IT department for backing-up team SharePoint sites into a backup FTP server. Even though team sites are not assumed to hold sensitive data, they are still backed-up to avoid loss of productivity.

FIG. 3 shows the representation of the above example in a DFG. The DFG comprises three vertices 90C, 90D and 90E, representing the HR system, the SharePoint site and the FTP server, respectively. A directed edge 94B represents the data movement operation of application #1 (from a vertex representing bank account numbers in the HR system to a vertex representing the files created in the finance department's SharePoint site). A directed edge 94C represents the data movement operation of Application #2.

With the DFG representation, it becomes evident that the concatenation of edges 94B and 94C creates a semi-directed multi-hop path from the HR system (and particularly the vertex representing the bank account number) to the FTP server (and the particular files saved on that server). This multi-hop path shows that application #1 and Application #2 act similarly to a single distributed application. This distributed application extracts employee bank account numbers from the HR system and stores them on the "finance team" folder in the FTP server.

This combined data movement (exposure of bank account numbers of an FTP server), which would be undetectable without the use of a DFG, was never intended and may well present a security hazard.

Figure 4:
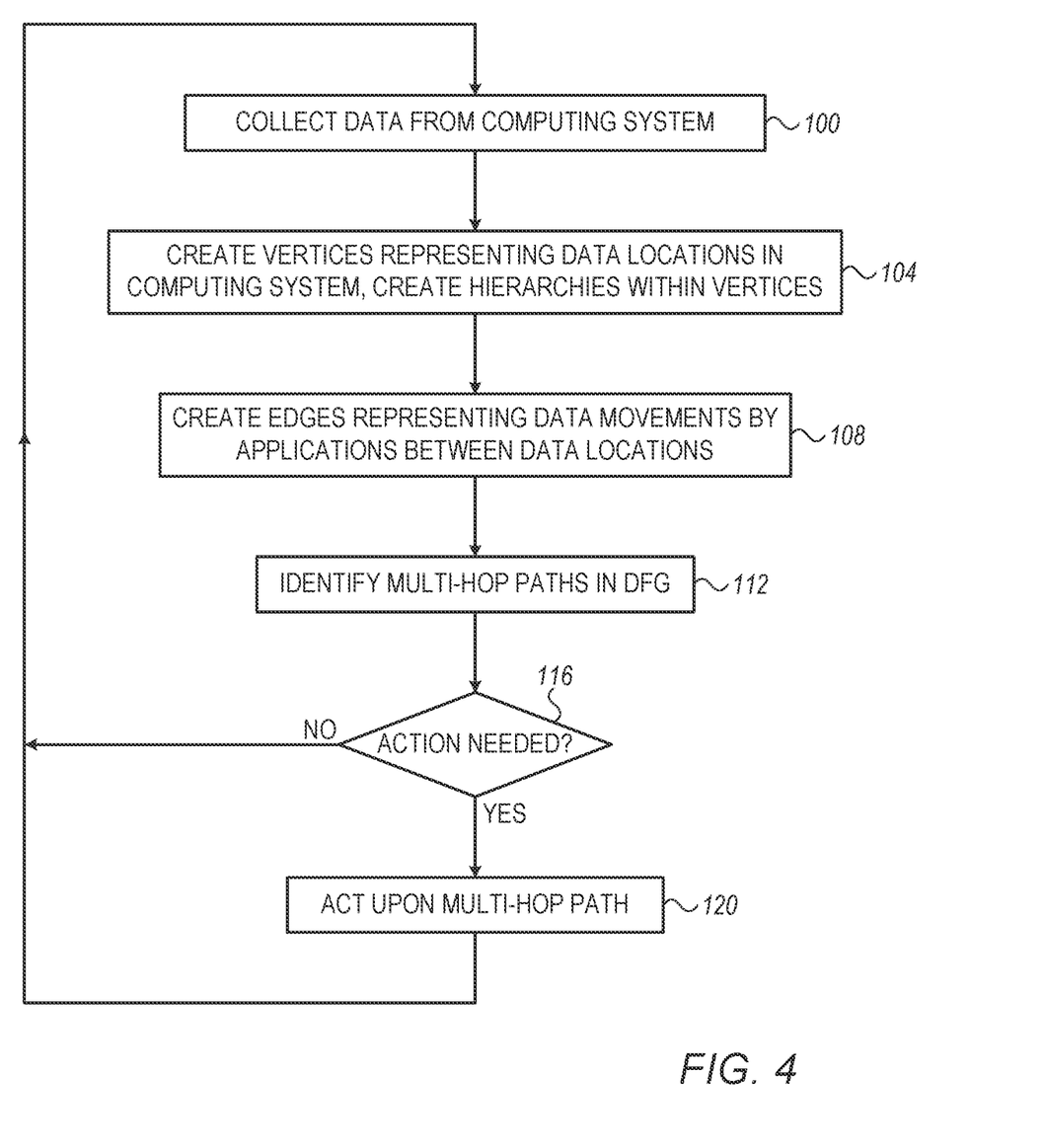
FIG. 4 is a flow chart that schematically illustrates a method for data-flow analysis, in accordance with an embodiment of the present invention.

FIG. 4 is a flow chart that schematically illustrates a method for analyzing the data-flow in computing system 24, performed by analysis system 20, in accordance with an embodiment of the present invention.

The method begins with data collection modules 60 (in processor 48 of system 20 seen in FIG. 1) collecting data from various platforms of system 24, at a data collection stage 100. Modules 60 typically collect data from multiple sources, including, for example, cloud APIs and logs, SaaS APIs and logs, automation platform APIs and logs, integration platform APIs and logs, Low-Code/No-Code platforms API and logs, network appliances, traditional DLP solutions, and/or any other suitable source.

Typically, the various platforms of system 24 (e.g., platforms 30, 32 and 34 in FIG. 1) support suitable operations that enable stopping and restarting applications 28. When interfacing with system 24, each platform is typically mapped to its stop/restart controls on each application 28. Interfaces 44 integrate with the various platforms to allow triggering these stop/restart operations. Integration can be accomplished either by API, by a partner program or by using an RPA solution to automate the process of triggering the operation as a human would. The stop/restart operations can later be used for cutting-off multi-hop paths that violate system policies, as described in detail below.

The data and operations that are collected from the various platforms are typically normalized by normalization module 76 into a consistent schema, according to the format of data locations, applications, and operations. DFG computation module 80 then converts the normalized data and operations into a DFG (e.g., DFG 88 of FIG. 2) having vertices 90 and edges 94.

At a vertex creation stage 104, module 80 defines multiple vertices 90 representing the data locations in system 24. As explained above, multiple hierarchy levels are created within the vertices so as to define the data location in increasing granularity levels. Within a given vertex 90, every pair of adjacent (parent-child) levels of hierarchy is connected by a bidirectional "hierarchy" edge.

At an edge creation stage 108, module 80 defines multiple directed edges 94 in the DFG. Each edge represents a data movement operation performed by a certain application 28. Each edge thus connects a data-source vertex to a data-sink vertex in the DFG. In other words, each application 28 is represented by module 80 as a set of directed edges from data-source vertices to data-sink vertices. If the application connects more than two data locations, module 80 defines a respective edge for each pair of connected data locations. If the application moves data in both directions, the edge is made bidirectional instead of directional. Edges typically connect the finest-granularity hierarchy levels available in the data-source and data-sink vertices.

In some embodiments, in carrying out stages 104 and 108, module 80 carries out the following steps per application 28:
  Create a unique list of data locations accessed by the application. Create a vertex hierarchy to represent these data locations.
  Create a unique list of data sources and data sinks.
  For each pair of [data source, data sink], identify the most granular data location vertices and connect them with a directed edge. If the data flows bidirectionally, define the edge as a bidirectional edge.
  Tag each edge with labels that represent information regarding the data object being transferred, such as PII, SSN, and credit card number patterns.
  Tag each edge with a pointer to the relevant application. Information regarding the application, its source and metadata is stored in a separate database (e.g., in memory 52).
  Tag each edge with the average volume of data that the application transfers per unit time, e.g., MB per hour.

The outcome of stages 104 and 108 is a fully defined DFG that represents the data flow in computing system 24.

Then, at a multi-hop detection stage 112, module 80 identifies one or more multi-hop paths in the DFG. Each multi-hop path comprises a sequential concatenation of two or more edges 94 that jointly moves certain data over two or more data locations.

At an action checking stage 116, DFG computation module 80 (or any of control modules 84) checks whether any of the detected multi-hop paths warrants a responsive action. A responsive action may be called for, for example, if a multi-hop path is suspected of identifying a security breach or some other policy or rule violation. Examples of possible violations and responsive actions are detailed further below.

If responsive action is needed, module 80 (or the appropriate control module 84) initiates such action, at an action stage 120. If no responsive action is warranted, stage 120 is skipped. The method then loops back to stage 100 above, for updating the data collection if needed, updating the DFG if needed, and identifying newly-added multi-hop paths if any. Previous versions of the DFG may be retained for analysis and comparison.

The method flow of FIG. 4 is an example flow that is depicted purely for the sake of conceptual clarity. In alternative embodiments, any other suitable flow can be used.

For example, in some embodiments, data collection modules 60 may extract and store relevant metadata regarding each application 28. This "application inventory" is typically stored in a separate database, e.g., in memory 52. Application metadata may comprise properties such as the application's platform, owner, last-modified timestamp and the operation used to stop and restart the application.

In some embodiments, data collection modules 60 may update the application inventory occasionally, e.g., periodically. Previous versions of the application inventory may be retained for analysis and comparison.

In some embodiments, analysis system 20 is able to identify and call-out the set of DFG edges 94 that are associated with a specific app 28. In this manner, the system can formulate and/or process queries in terms of both data and apps using the same DFG.

Example Use-Cases and Controls

As noted above, analysis system 20 may comprise various control modules 84, which query DFG 56 for performing various analysis and/or control tasks. The following description describes examples of control modules and the way they use the disclosed DFG.

Visibility module: A software module that visualizes the DFG to users. The visibility module may present a Graphical User Interface (GUI) showing the DFG or relevant parts thereof. Among other features, the visibility module may visualize multi-hop data flows, e.g., as multi-vertex paths between vertices (or groups of vertices). In some embodiments, the visibility module may aggregate data across multiple paths between two vertices (and groups of vertices) and show parameters such as the total amount, sensitivity, involved data objects and consistency of data that flows between them. By using the DFG presented by the visibility module, users can understand the way data flows across the computing system, e.g., how data moves between different cloud services, on-premises and SaaS platforms.

Exploration module: A software module that enable users (e.g., security and data governance teams) to explore the DFG with queries. Example queries may comprise:

"Show all flows that move data between On-Premises and Salesforce."

"Are there any multi-hop data flows between Production and Dev environments?"

"How much data is being moved between my organization and unmanaged endpoints?"

The exploration module may enable users to specify queries using multiple levels of granularity, e.g., queries that reference the service (e.g., Salesforce), the instance (e.g., Production), the specific object (e.g., a Sales Account) and object properties (e.g., an object containing SSN or PII).

Using the DFG, queries that explore data flow can be modeled as graph connectivity problems. For example, the exploration module may translate a query such as "Show all flows that move data between On-Premises platforms and Salesforce" into "find all directional paths in the DFG between the On-Prem and the Salesforce vertices". The hierarchical representation of data locations allows these questions to be asked on every possible level of granularity.

Control module: A software module that allows users to specify "segmentation rules"—rules that specify how data is permitted and/or forbidden to flow. In an embodiment, users may formulate segmentation rules using business language, e.g., "PII from Salesforce cannot flow into personal employee Dropbox accounts". In specifying segmentation rules, users may refer to various levels of granularity, from high level such as "on-prem data cannot flow to AWS", to low-level such as "SharePoint site with address X cannot contain SSNs".

The control module typically translates the user-specified segmentation rules into control rules formulated in terms of DFG vertices and groups of vertices. For example, a segmentation rule stating data cannot move from A to B will be translated into a control rule stating there cannot be directional connectivity between vertices A and B. The control rules can be set on any level of granularity (including levels automatically learned and defined by the system). The control rules may, for example, restrict data between "production" and "development" environments (high-level vertices), as well restrict data flow between "PII or SSN in any data source" and "personal storage on DropBox" (low-level vertices).

In some embodiments, when the DFG changes, the control module may re-evaluate some or all the control rules. The evaluation aims to detect data paths that are inconsistent with the rules, and/or non-compliant data paths that no longer exist.

Policy module: A software module that allows users to specify how the system will respond to violations of control rules. Various responsive actions can be taken when a violation is identified.

For example, a violating data flow can be cut-off by disabling one or more applications 28 along its multi-hop path. For this purpose, the system may use the stop/restart operations of the various applications 28, as collected by data collection modules 60 (see stage 100 of FIG. 4). A user can choose which application or applications to disable, e.g., the last application on the multi-hop path, or applications on the edges of the multi-hop path that move or copy data from the source or sink.

As another example, the system may trigger an alert, e.g., to the various application owners, to a security team and/or to a data governance team. An alert may trigger additional exception and vulnerability manager processes. Disabling applications is possible across different application platforms and environments.

In some embodiments, a user may specify for a given rule violation (i) which applications are in scope and (ii) what action should be taken. Examples of specifying "applications in scope" may comprise:

The last application to be modified on the non-compliant multi-hop path.

The last application to be identified on the non-compliant multi-hop path.

All applications on the on the non-compliant multi-hop path.

The applications that connect to the source and sink of the on the non-compliant multi-hop path.

The applications that connect to the source of the non-compliant multi-hop path.

The applications that connect to the sink of the non-compliant multi-hop path.

Examples of possible actions may comprise:

Disabling the application.

Alerting the application owner.

Alerting a security team, a data governance team or any other relevant team or identity.

Alerting a webhook, which is used for customization by the organization. The webhook event contains all information about the control rule, the violation and the related applications.

In an embodiment, a violated control rule may trigger multiple processes, with any combination of the above application scopes and actions, or any other suitable scopes and/or actions.

What-if analysis module: A software module that enables users to test the possible implications of a new or modified control rule or policy. This module may check, for example, which applications 29 would violate a new policy or rule, which applications could be re-enabled (i.e., would no longer violate the new policy or rule), which data flows would stop and restart, and the like.

In some embodiments, when a new control rule is created or an existing control rule is modified, the "what-if" module can be used to identify the exact applications, data amount, data objects and end-to-end flows that would be affected by the modification. The "what-if" module typically makes these identifications by issuing vertex connectivity queries to the DFG.

Recommendation module: A software module that suggests control rules and policies to users, for possible consideration and adoption. The recommendation module may issue recommendations based on, for example, best practices, industry standards as seen in other organizations, and Machine Learning. In example embodiments, the recommendation module may create a recommended control configuration, custom-made for the specific organization. The recommendation module may continuously recommend changes and improvements to existing controls.

The recommendation module may issue recommendations in three layers:

Layer #1: best practices. The system is embedded with a large and continually-updated set of best practices on how data should and should not flow. These best practices may comprise, for example, rules that follow compliance standards which articulate how and where data should be stored. Best practices rules may comprise, for example:
1. Sensitive data should not be stored in a personal account, where sensitive data is defined by the existence of PII, SSN, credit card numbers and other patterns.
2. Production and development environments should be completely separate from each other (bidirectionally).
3. Data should stay within its geographical boundaries.

Layer #2: automatically-learned industry standards. The recommendation module may analyze control rules, create different types of clusters, and recommend rules accordingly. Such created clusters may be, for example, industry specific, automatically created application workload, purpose based, geography based, company-size based, etc. By analyzing control rules set by multiple organizations, for example in the same industry, The recommendation module may automatically infer and suggest control rules to other, similar, organizations. An example recommendation process may comprise the following:
1. Control rules are anonymized and assigned to a specific sector and company size.
2. A Machine Learning algorithm is trained to predict the right control rules for each anonymized organization, given anonymized data of all organizations as training data.
3. The algorithm is fed information about a new organization, and outputs a predicted set of control rules.
4. The predicted control rules are presented to the organization as recommended control rules.

Layer #3: current state. In an embodiment, when the recommendation module is first deployed, it enters a learning phase in which it records changes to the DFG. Once enough information has been collected and the DFG reaches a stable state, the recommendation module creates a set of control rules which specify the existing data flow paths. These rules can then be applied as active control rules, alerting on any change to the DFG. Such recommended rules are especially useful in high-sensitivity production environments, in which applications are stable and every behavioral change should be subjected to a detailed review.

Risky flow detection module: A software module that automatically detects multi-hop paths corresponding to dangerous or potentially malicious data flows, and alerts users. In some embodiments, risky flows are detected in three layers:

Layer #1: Security signatures. Security signatures written by security experts can identify a wide range of scenarios in which data flows in a risky path and might indicate a security breach. These rules are similar to the rules specified at Layer #1 of the Recommendation module, however their severity and specificity may be different. Signature are typically drawn from analysis of past malicious campaigns and active security research. Signatures typically use properties like how the data moves, who owns the moving applications, what else are they doing in the organization, their role in the organization, and when the applications were created or modified. Signatures can also be labeled by customers, thus creating a common shared threat intelligence base of detection leveraged across industries and customers.

Layer #2: volumetrics. The module identifies whenever the amount of data that flows in a specific multi-hop path changes considerably. The change can be a sudden change (spike) or a gradual change over time.

Layer #3: behavioral detection. The module profiles every user (e.g., application owner) and every application, to create a baseline of how they normally behave. This baseline may comprise properties like:
1. How often an application changes.
2. How often a user creates a new application or changes an existing one.
3. Areas of the DFG that are typically accessed by applications created by the user.

The module can then alert on every change to the behavioral profile of either a user or an application.

Although the embodiments described herein mainly address data leakage and other security breaches, the methods and systems described herein can also be used in other applications, such as in business continuity applications (e.g., for identifying potential issues with critical applications and their dependencies), in hygiene applications (e.g., for finding outdated and unused apps that handle business data), in compliance applications (e.g., for identifying locations where sensitive data is stored), in debugging applications, and/or any other suitable application or use case.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data-flow analysis, the method comprising:
constructing a data-flow graph for a computing system that runs multiple software applications, the data-flow graph comprising (i) vertices representing data locations in the computing system, and (ii) edges representing data movements performed by the software applications between the data locations;
identifying in the data-flow graph a multi-hop path comprising a sequence of two or more edges that represents multi-hop movement of data in the computing system, the multi-hop path indicative of an unintentional dependency between two or more of the software applications that causes a policy violation; and
acting upon the identified multi-hop path.

2. The method according to claim 1, wherein constructing the data-flow graph comprises defining, in a vertex that represents a data location, multiple levels of hierarchy that specify the data location with increasing levels of granularity.

3. The method according to claim 1, wherein the policy violation comprises a security breach.

4. The method according to claim 1, wherein acting upon the identified multi-hop path comprises specifying a segmentation rule with respect to the data-flow graph, and initiating an action in response to detecting a violation of the segmentation rule.

5. The method according to claim 1, wherein acting upon the identified multi-hop path comprises disabling one or more of the applications that move data on the identified multi-hop path.

6. The method according to claim 1, wherein acting upon the identified multi-hop path comprises issuing an alert.

7. The method according to claim 1, wherein constructing the data-flow graph comprises collecting from the computing system information pertaining to the software applications and to the data movement operations, normalizing the information to a common schema, and constructing the data-flow graph from the normalized information.

8. The method according to claim 1, and comprising presenting at least part of the data-flow graph visually to a user.

9. The method according to claim 1, and comprising receiving a query from a user, and serving the query by querying the data-flow graph.

10. An apparatus for data-flow analysis, the apparatus comprising:
one or more interfaces for connecting to a computing system that runs multiple software applications; and
one or more processors, configured to:
construct a data-flow graph for the computing system, the data-flow graph comprising (i) vertices representing data locations in the computing system, and (ii) edges representing data movements performed by the software applications between the data locations;
identify in the data-flow graph a multi-hop path comprising a sequence of two or more edges that represents multi-hop movement of data in the computing system, the multi-hop path indicative of an unintentional dependency between two or more of the software applications that causes a policy violation; and
act upon the identified multi-hop path.

11. The apparatus according to claim 10, wherein the one or more processors are configured to define, in a vertex that represents a data location, multiple levels of hierarchy that specify the data location with increasing levels of granularity.

12. The apparatus according to claim 10, wherein the policy violation comprises a security breach.

13. The apparatus according to claim 10, wherein the one or more processors are configured to act upon the identified multi-hop path by specifying a segmentation rule with respect to the data-flow graph, and initiating an action in response to detecting a violation of the segmentation rule.

14. The apparatus according to claim 10, wherein the one or more processors are configured to act upon the identified multi-hop path by disabling one or more of the applications that move data on the identified multi-hop path.

15. The apparatus according to claim 10, wherein the one or more processors are configured to act upon the identified multi-hop path by issuing an alert.

16. The apparatus according to claim 10, wherein the one or more processors are configured to construct the data-flow graph by collecting from the computing system information pertaining to the software applications and to the data movement operations, normalizing the information to a common schema, and constructing the data-flow graph from the normalized information.

17. The apparatus according to claim 10, wherein the one or more processors are configured to present at least part of the data-flow graph visually to a user.

18. The apparatus according to claim 10, wherein the one or more processors are configured to receive a query from a user, and to serve the query by querying the data-flow graph.

* * * * *